United States Patent
Meissner et al.

(10) Patent No.: US 10,746,532 B2
(45) Date of Patent: Aug. 18, 2020

(54) DEVICE FOR INTERFEROMETRIC DISTANCE MEASUREMENT

(71) Applicant: DR. JOHANNES HEIDENHAIN GmbH, Traunreut (DE)

(72) Inventors: Markus Meissner, Uebersee (DE); Wolfgang Holzapfel, Obing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 91 days.

(21) Appl. No.: 16/047,691

(22) Filed: Jul. 27, 2018

(65) Prior Publication Data
US 2019/0041193 A1 Feb. 7, 2019

(30) Foreign Application Priority Data
Aug. 1, 2017 (DE) .......... 10 2017 213 258

(51) Int. Cl.
*G01B 11/14* (2006.01)
*G01B 11/02* (2006.01)
(Continued)

(52) U.S. Cl.
CPC .......... *G01B 11/14* (2013.01); *G01B 9/02007* (2013.01); *G01B 11/026* (2013.01);
(Continued)

(58) Field of Classification Search
CPC .. G01B 9/02007; G01B 11/026; G01B 11/14; G01B 9/02044; G01S 17/08;
(Continued)

(56) References Cited

U.S. PATENT DOCUMENTS 5,469,265 A 11/1995 Measures et al.
6,018,534 A * 1/2000 Pan .............. H01S 3/0675
372/102

(Continued)

FOREIGN PATENT DOCUMENTS

CN 103107478 B 10/2014
RO 130868 A2 1/2016

OTHER PUBLICATIONS

Bouffaron, R. et al. "All-optical acoustic array for underwater surveillance". Fifth European Workshop on Optical Fibre Sensors, Proc. of SPIE vol. 8794, 87940N, 2013, pp. 87940N-1-87940N-5. (Year: 2013).*

(Continued)

*Primary Examiner* — Michael A Lyons
(74) *Attorney, Agent, or Firm* — Hunton Andrews Kurth LLP

(57) ABSTRACT

An interferometric distance measurement device includes a multiple wavelength light source, supplying a light beam having at least three different wavelengths. An interferometer unit is provided, which splits the light beam into a measuring light beam and a reference light beam. The measuring and reference light beams reflected back by measuring and reference reflectors are superimposed in an interfering manner to form an interference light beam. The interference light beam is split via a detection unit such that, in each instance, a plurality of phase-shifted, partial interference signals result per wavelength. With the aid of a signal processing unit, an absolute position information item regarding the measuring reflector is determined from the partial interference signals of different wavelengths.

19 Claims, 7 Drawing Sheets

(51) Int. Cl.
  *G01S 17/36* (2006.01)
  *G01B 9/02* (2006.01)
  *G01S 17/10* (2020.01)
  *H01S 3/00* (2006.01)
  *H01S 3/067* (2006.01)
  *H01S 3/08* (2006.01)
  *H01S 3/094* (2006.01)
  *H01S 3/0941* (2006.01)
  *H01S 3/10* (2006.01)
  *H01S 3/102* (2006.01)
  *H01S 3/106* (2006.01)
  *H01S 3/16* (2006.01)

(52) U.S. Cl.
  CPC .............. *G01S 17/10* (2013.01); *G01S 17/36* (2013.01); *H01S 3/0071* (2013.01); *H01S 3/0675* (2013.01); *H01S 3/06712* (2013.01); *H01S 3/08086* (2013.01); *H01S 3/0941* (2013.01); *H01S 3/094003* (2013.01); *H01S 3/1022* (2013.01); *H01S 3/1028* (2013.01); *H01S 3/10053* (2013.01); *H01S 3/1067* (2013.01); *H01S 3/1608* (2013.01)

(58) Field of Classification Search
  CPC ............... H01S 3/0675; H01S 3/08086; H01S 3/094003; H01S 3/0941; G01J 3/0224; G01J 3/18
  See application file for complete search history.

(56) References Cited

U.S. PATENT DOCUMENTS

| | | | | |
|---|---|---|---|---|
| 6,028,881 | A * | 2/2000 | Ackerman | H01S 3/0675 |
| | | | | 372/6 |
| 6,496,266 | B1 | 12/2002 | Nishioki | |
| 2005/0141077 | A1* | 6/2005 | Kim | H01S 3/06754 |
| | | | | 359/333 |
| 2006/0285794 | A1* | 12/2006 | Meyer | H01S 3/06795 |
| | | | | 385/37 |
| 2011/0141480 | A1 | 6/2011 | Meissner | |

OTHER PUBLICATIONS

European Search Report issued in European Patent Application No. 18184096, dated Jan. 11, 2019 (5 pages total).

* cited by examiner

DEVICE FOR INTERFEROMETRIC DISTANCE MEASUREMENT

CROSS-REFERENCE TO RELATED APPLICATIONS

The present application claims priority to Application No. 10 2017 213 258.2, filed in the Federal Republic of Germany on Aug. 1, 2017, which is expressly incorporated herein in its entirety by reference thereto.

FIELD OF THE INVENTION

The present invention relates to a device for interferometric distance measurement, which may, for example, be suitable for determining absolute distances between two objects movable relative to each other.

BACKGROUND INFORMATION

Certain multiple-wavelength methods for interferometrically determining absolute distances between two objects movable relative to each other are conventional. In this context, one or more beat phases, which allow an unequivocal, absolute position determination over a larger distance range, are determined from the subtraction of interference phases of different wavelengths. In this instance, corresponding devices may also be configured in a cascaded manner, and starting from a plurality of different wavelengths, the generation of a plurality of beat phases may be provided. Regarding such devices, reference is made, for example, to U.S. Pat. No. 6,496,266, which describes a system operable using three different wavelengths, a plurality of beat phases and/or synthetic wavelengths being derived from the three wavelengths, and from this, information regarding absolute position being generated.

In the system described in U.S. Pat. No. 6,496,266, a total of three laser light sources in the form of stabilized He—Ne lasers are provided for generating the required plurality of wavelengths, which constitutes a considerable expenditure for equipment. In addition, a complex calibration of the plurality of light sources is necessary, in order to ensure that the emitted beams of light of all of the light sources traverse the identical paths in the measuring and reference arm of the interferometer. Furthermore, the three separate laser light sources require control of each individual light source, in order to ensure that the wavelengths of the individual lasers are stable over time and have a specific value.

SUMMARY

Example embodiments of the present invention provide a device for absolute interferometric distance measurement, in which expenditures on the side of the utilized light source may be reduced.

According to an example embodiment of the present invention, a device for interferometric distance measurement includes a multiple-wavelength light source, which supplies a beam of light having at least three different wavelengths and is arranged as a fiber laser, which includes at least three different Bragg gratings, whose grating constants are matched to the wavelengths generated. In addition, an interferometer unit is provided, which splits up the light beam into a measuring light beam and a reference light beam. The measuring light beam propagates in a measuring arm, in the direction of a measuring reflector, and there, it is reflected back, and the reference light beam propagates in a reference arm in the direction of a stationary reference reflector, and there, it is reflected back. The measuring and reference light beams reflected back by the measuring and reference reflectors are superimposed in an interfering manner to form an interference light beam. The interference light beam is split up via a detection unit such that, in each instance, a plurality of phase-shifted, partial interference signals result per wavelength. In addition, a signal processing unit is provided, which is configured to determine an absolute position information item regarding the measuring reflector, from the partial interference signals.

It is possible for the multiple wavelength light source to include at least the following components: a pump light source; at least three Bragg gratings, which are integrated into one or more laser-active fibers, each of the Bragg gratings having a phase shift of magnitude n; and coupling optics, through which the pump radiation emitted by the pump light source may be coupled into the at least one laser-active fiber.

In this connection, the at least three Bragg gratings may be positioned in the at least one laser-active fiber so as to overlap completely along the fiber extension direction, so that the phase shifts of all of the Bragg gratings are at the same location.

It is also possible for the at least three Bragg gratings to be positioned so as to be displaced with respect to each other along the fiber extension direction, by particular offset distances, so that the phase shifts of all of the Bragg gratings along the fiber extension direction are likewise displaced with respect to each other by the offset distances.

In this connection, in the case of three Bragg gratings and: a) with offset distances between 0% and 50% of the effective grating length of a Bragg grating, the laser-active fiber may include first grating sections having Bragg gratings that possess a grating constant, second grating sections having two overlapping Bragg gratings that possess different grating constants, as well as third grating sections having three overlapping Bragg gratings that possess different grating constants; or b) with offset distances between 50% and 100% of the effective grating length of a Bragg grating, the laser-active fiber may include first grating sections having Bragg gratings of one grating constant and second grating sections having two overlapping Bragg gratings that possess different grating constants; or c) with offset distances of 100% of the effective grating length of a Bragg grating, the laser-active fiber may include exclusively grating sections having Bragg gratings of one grating constant.

The at least one laser-active fiber may take the form of an erbium-doped, single-mode glass fiber, which emits laser radiation having a specific polarization direction.

The at least one laser-active fiber may be mounted in tension between two fixing points, in a fiber holding device, and the at least three Bragg gratings may be arranged in the region between the two fixing points in the fiber holding device.

It is possible for a control unit to act upon the multiple wavelength light source via one or more control elements, in order to generate laser radiation having specific wavelengths; and an electrical signal, which is derived from an optical signal of only one of the different wavelengths, acting as an input signal of the control unit.

In this connection, the control elements may include at least one of the following devices: a) a piezoelectric actuator unit for exerting a specific mechanical tension on the at least one laser-active fiber; b) a tempering unit for setting a specific temperature of the at least one laser-active fiber; and c) a current source for setting a specific pump current of a pumping light source for the at least one laser-active fiber.

The multiple wavelength light source may be configured to emit radiation having a first wavelength ($\lambda_1$) and two further wavelengths ($\lambda 2$, $\lambda 3$), the following applying to the two further wavelengths ($\lambda 2$, $\lambda 3$):

$$\lambda_2 = \frac{CAF_1}{CAF_1 \pm 1} \cdot \lambda_1$$

and:

$$\lambda_3 = \frac{\lambda_1 \cdot \lambda_2}{\lambda_1 \pm \lambda_2 \cdot \frac{CAF_2 \pm 1}{CAF_1 \cdot CAF_2}}$$

where $$CAF_1 = \frac{\Lambda_1}{\lambda_1} \text{ and } CAF_2 = \frac{\Lambda_3}{\lambda_1}$$

and $\lambda_1$, $\lambda_2$, $\lambda_3$ represent the emitted wavelengths of the multiple wavelength light source, and $$\Lambda_1 = \left|\frac{\lambda_1 \cdot \lambda_2}{\lambda_1 - \lambda_2}\right| = CAF_1 \cdot \lambda_1$$

$$\Lambda_2 = \left|\frac{\lambda_2 \cdot \lambda_3}{\lambda_2 - \lambda_3}\right|$$

$$\Lambda_3 = \left|\frac{\Lambda_2}{\Lambda_1 - \Lambda_2}\right| \cdot \Lambda_1 = CAF_2 \cdot \Lambda_1.$$

The interferometer unit may include a beam splitter unit, the measuring reflector movable along at least one measuring direction, the stationary reference reflector, as well as a beam combiner unit. In this case, the light beam is spit up into a measuring and a reference light beam by the beam splitter unit, and the measuring and reference light beams are superimposed by the beam combiner unit to form the interference light beam.

In this connection, it is possible for the beam splitter unit and the beam combiner unit to be formed together in a beam splitter cube.

In addition, the detection unit may include at least one splitter element, at least one polarization element, as well as a downstream detector array made up of at least nine optoelectronic detector elements. The interference light beam is split up into at least three groups of interference light beams as a function of wavelength, using the at least one splitter element and the at least one polarization element. Each of the at least three groups of interference light beams includes at least three phase-shifted, partial interference light beams.

The detection unit may include two splitter elements, a splitting into a plurality of phase-shifted interference light beams taking place via a splitter element, and a wavelength-dependent splitting into a plurality of partial interference light beams taking place via the other splitter element.

The signal processing unit may be configured to: (a) determine one phase value per wavelength from the phase-shifted, electrical, partial interference signals of the different wavelengths; (b) form a plurality of differential phases from the phase values, the differential phases each being assigned to different synthetic wavelengths; and (c) determine a high-resolution, absolute position information item regarding the measuring reflector, from a rough position signal obtained via an additional rough position measurement, as well as from the differential phases.

In accordance with example embodiments of the present invention, expenditures relating to the light source, for generating the plurality of wavelengths, may be reduced considerably. Only a single light source, which supplies all of the necessary wavelengths for the absolute interferometric position determination, is provided in place of a plurality of individual light sources.

In addition, only the stabilization of a single wavelength is necessary, which considerably reduces the necessary control expenditure for the light source.

Furthermore, in comparison with the case of a plurality of separate light sources, the need for expensive adjustment of a plurality of light beams of different wavelengths to form a single collinear beam of light is eliminated.

Moreover, the multiple wavelength light source provided ensures an exceedingly low line width and, consequently, a large coherence length. The consequence of this for the position measurement is low background noise of the position measurement values and, consequently, increased measurement accuracy.

Further features and aspects of example embodiments of the present invention are described in further detail below with referenced to the appended Figures.

DETAILED DESCRIPTION

Figure 1:
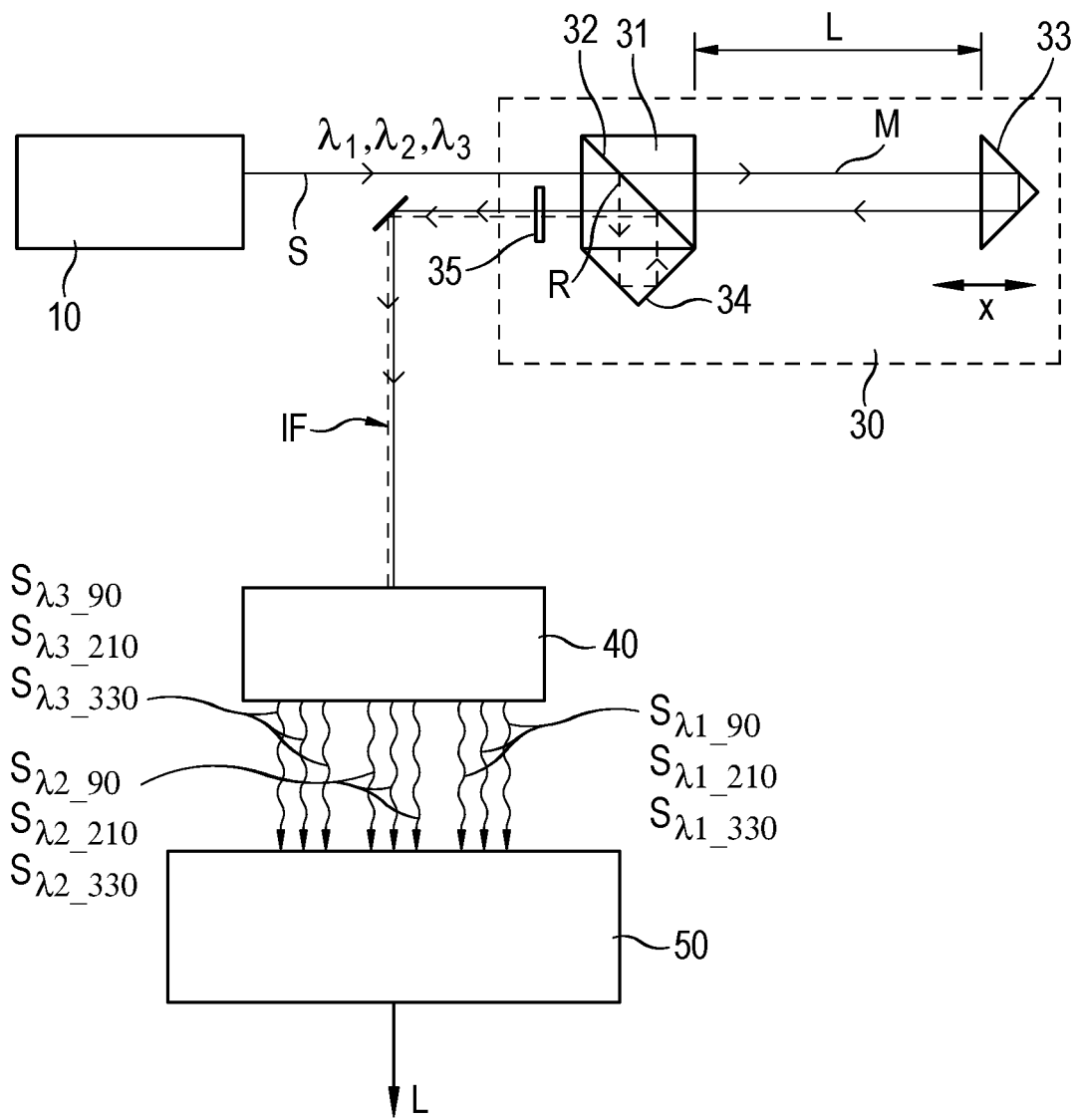
FIG. 1 is a schematic view of a device according to an example embodiment of the present invention.

FIG. 1 is a schematic view of a device for interferometric distance measurement according to an example embodiment of the present invention. The device includes a multiple wavelength light source 10, an interferometer unit 30, a detection unit 40, as well as a signal processing unit 50. In the present example embodiment, the highly precise measurement of absolute distance L between two objects, which move relative to each other, is possible with the aid of the device described herein. In the present example embodiment, one of the two objects is connected to measuring reflector 33, which belongs to interferometer unit 30 and is movable along measuring direction x, and the other of the two objects is connected to the other components of interferometer unit 30 mounted opposite to it in a stationary manner.

The two objects may be, for example, machine parts, which are movable relative to each other, and whose absolute spacing L is determinable with the aid of the interferometric distance measurement device. The information, which relates to absolute distance L and is generated with the aid of the interferometric distance measurement device, may be processed further by a superordinate machine control system.

In addition, it is also possible to use the interferometric distance measurement device in laser trackers or laser tracers. In this case, the absolute distance between the stationary components of interferometer unit 30 and the measuring reflector 33 movable in space is determined. Such systems may be used in connection with many different measuring and/or calibration tasks. Furthermore, there are additional and alternative uses for the interferometric distance measurement device.

Before the individual components of the interferometric distance measurement device, as well as a suitable method for operating the same, are described below in detail, in light of the Figures, the general configuration and functioning principle of the corresponding device will be explained first.

Multiple wavelength light source 10 provided in the interferometric distance measurement device emits a beam of light S having at least three different wavelengths $\lambda_1$, $\lambda_2$, $\lambda_3$, which each have a small spectral line width. In this connection, multiple wavelength light source 10 takes the form of a fiber laser, which includes at least three different Bragg gratings, whose grating constants are matched to generated wavelengths $\lambda_1$, $\lambda_2$, $\lambda_3$. For further details of multiple wavelength light source 10, reference is made to the subsequent description of FIGS. 2, 3, 4a to 4d, 5, and 6. For further details regarding the selection of suitable wavelengths $\lambda_1$, $\lambda_2$, $\lambda_3$, reference is made to the description of FIG. 8.

Light beam S supplied by multiple wavelength light source 10 arrives at interferometer unit 30, where light beam S is split up into a measuring light beam M and a reference light beam R with the aid of beam splitter unit 31, which is implemented as a polarizing beam splitter. After the splitting, measuring light beam M propagates in a measuring arm, in the direction of a measuring reflector 33 movable at least along measuring direction x, and there, it is reflected back in the direction of incidence. After the splitting, reference light beam R propagates in a reference arm, in the direction of a stationary reference reflector 34, and there, it is reflected back in the direction of incidence, as well. In the illustrated example embodiment, both measuring reflector 33 and reference reflector 34 take the form of retroreflecting triple mirrors. Measuring and reference light beams M, R reflected back by measuring and reference reflectors 33, 34 then arrive at the beam combiner unit 31, which is arranged as a polarizing beam splitter, and there, they are superimposed in an interfering manner to form an interference light beam IF. In the exemplary embodiment illustrated FIG. 1, a single component in the form of a beam splitter cube is provided as beam splitter unit 31 and beam combiner unit 31, e.g., the two units being formed together in the beam splitter cube. At beam splitting and beam combining surface 32 of the beam splitter cube, light beam S is split up into measuring and reference light beams M, R, and measuring and reference light beams M, R are recombined to form interference light beam IF. At the outlet of interferometer unit 30, interference light beam IF passes through one more $\lambda/4$ plate, which superimposes the s- and p-polarized portion of interference light beam IF with a rotating E-field vector, whose angle of rotation is taken into consideration for the analysis. Thus, in the present exemplary embodiment, interferometer unit 30 is configured as a polarization-coded interferometer.

With regard to interferometer unit 30, it should be understood that a Michelson interferometer, as illustrated in FIG. 1, is merely exemplary and that alternative interferometer arrangements and/or components may also be used in interferometer unit 30. Thus, it would also be possible, for example, to use spheres having an index of refraction n=2 as reflectors, between which the absolute distance is measured. In addition, measuring and reference reflectors formed differently, e.g., plane reflectors, etc., may also be used. In the same manner, a Mach-Zehnder interferometer having separate beam splitter and beam combiner units for splitting up and combining the measuring and reference light beams, etc., may be provided.

The interference light beam IF generated with the aid of interferometer unit 30 then propagates in the direction of detection unit 40. With the aid of detection unit 40, interference light beam IF is split up and processed further in such a manner, that on the output side, in each instance, a plurality of electrical, phase-shifted, partial interference signals $S_{\lambda1\_90}$, $S_{\lambda1\_210}$, $S_{\lambda1\_330}$, $S_{\lambda2\_90}$, $S_{\lambda2\_210}$, $S_{\lambda2\_330}$, $S_{\lambda3\_90}$, $S_{\lambda3\_210}$, $S_{\lambda3\_330}$ are produced, that is, for each wavelength, three partial interference signals $S_{\lambda1\_90}$, $S_{\lambda1\_210}$, $S_{\lambda1\_330}$, $S_{\lambda2\_90}$, $S_{\lambda2\_210}$, $S_{\lambda2\_330}$, $S_{\lambda3\_90}$, $S_{\lambda3\_210}$, $S_{\lambda3\_330}$ shifted in phase by 120°. Then, in the present example including three wavelengths $\lambda_1$, $\lambda_2$, $\lambda_3$, a total of nine partial interference signals $S_{\lambda1\_90}$, $S_{\lambda1\_210}$, $S_{\lambda1\_330}$, $S_{\lambda2\_90}$, $S_{\lambda2\_210}$, $S_{\lambda2\_330}$, $S_{\lambda3\_90}$, $S_{\lambda3\_210}$, $S_{\lambda3\_330}$ are present at the output of detection unit 40, which are subsequently processed further for position measurement. With regard to a possible arrangement of detection unit 40, reference is made to the subsequent description of FIG. 7.

The further processing of partial interference signals $S_{\lambda1\_90}$, $S_{\lambda1\_210}$, $S_{\lambda1\_330}$, $S_{\lambda2\_90}$, $S_{\lambda2\_210}$, $S_{\lambda2\_330}$, $S_{\lambda3\_90}$, $S_{\lambda3\_210}$, $S_{\lambda3\_330}$ takes place subsequently in signal processing unit 50, which is schematically illustrated in FIG. 1. This is configured to determine, from partial interference signals $S_{\lambda1\_90}$, $S_{\lambda1\_210}$, $S_{\lambda1\_330}$, $S_{\lambda2\_90}$, $S_{\lambda2\_210}$, $S_{\lambda2\_330}$, $S_{\lambda3\_90}$, $S_{\lambda3\_210}$, $S_{\lambda3\_330}$ of different wavelengths $\lambda_1$, $\lambda_2$, $\lambda_3$, an absolute position information item in the form of distance L between measuring reflector 33 and beam splitter unit 31. This is accomplished with the aid of a multiple wavelength beat method. With regard to the evaluation method and the specific construction of signal processing unit 50, reference is made to the further description of FIG. 8.

The multiple wavelength light source 10 used in the interferometric distance measurement device is described with reference to FIGS. 2, 3, 4a to 4d, 5, and 6.

As mentioned above, multiple wavelength light source 10 is configured as a fiber laser, and to be more precise, in the form of a so-called DFB fiber laser (DFB—distributed feedback). According to FIG. 2, the fiber laser includes, as a central component, a laser-active fiber 13 having a suitably doped fiber core. At a fiber end face, the optical pumping radiation emitted by a pumping light source for exciting the laser emission is coupled into fiber 13 via coupling optics 12. In this connection, for instance, a semiconductor laser in the form of a GaAlAs diode laser, which emits pump radiation having a wavelength of 976 nm, may be used as a pumping light source 11.

In the present example, laser-active fiber 13 takes the form of an erbium-doped, single-mode glass fiber, which emits laser radiation having a specific polarization direction after suitable excitation. Therefore, in the present exemplary embodiment of multiple wavelength light source 10, erbium is used as a laser-active medium. This laser medium allows very narrow-band laser radiation to be produced at the three wavelengths $\lambda_1$, $\lambda_2$, $\lambda_3$, which means that a large coherence length in the range of several kilometers may be ensured. The large coherence length is especially favorable, in particular, in the case of use for interferometric distance measurement, since the noise of the measured position values generated may be minimized over it. Further advantages of the multiple wavelength light source 10 configured as a fiber laser include its ability to be manufactured easily and its robustness.

Figure 3:
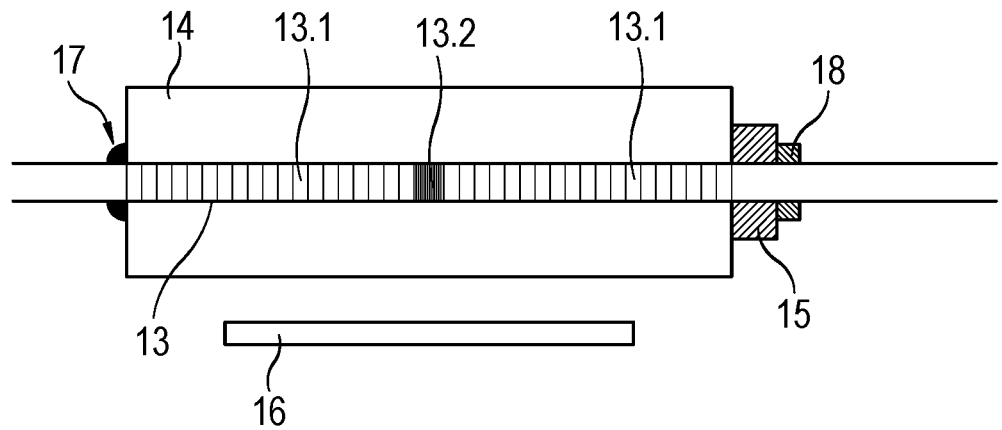
FIG. 3 is an enlarged view the multiple wavelength light source illustrated in FIG. 2.

At least three Bragg gratings, which are used, in each instance, for the specific wavelengths, in order to form the laser resonant cavity necessary for operation of the laser, are integrated and/or inscribed into laser-active fiber 13 and/or into the erbium-doped fiber core. In FIG. 3, the grating resulting from the superposed layout of the individual Bragg gratings is indicated by reference numeral 13.1. The Bragg gratings in fiber 13 and/or in the fiber core, each take the form of binary refractive index gratings. This means that each Bragg grating is made up of a consecutive arrangement of grating regions periodic along the fiber extension direction, which have different indices of refraction. With regard to the relative positioning of the at least three Bragg gratings in fiber 13, there are, in general, different options, as is explained below, with reference to FIGS. 4a to 4d. In the example of FIG. 3, the three provided Bragg gratings having identical grating lengths are positioned along the extension direction of fiber 13 so as to overlap completely.

Grating constants $d_1$, $d_2$, $d_3$ of the three Bragg gratings are matched to the three wavelengths $\lambda_1$, $\lambda_2$, $\lambda_3$ to be generated in light beam S, that is, the three Bragg gratings have different grating constants $d_1$, $d_2$, $d_3$. For the selection of wavelengths $\lambda_1$, $\lambda_2$, $\lambda_3$ suitably matched to each other, in addition to the following remarks, reference is also made to the description of FIG. 8. In order to provide the desired, very narrow-band, single-mode laser operation at the three wavelengths $\lambda_1$, $\lambda_2$, $\lambda_3$, each of the three Bragg gratings also has a phase shift 13.2 of magnitude $\pi$, which may be provided centrally or centrically in the Bragg grating. A phase shift 13.2 of magnitude n means that on the two sides of phase shift 13.2, the two partial Bragg gratings are displaced by a half grating period with respect to each other. Due to the completely overlapping layout of the three Bragg gratings along the fiber extension direction, which is provided in the example of FIG. 3, the phase shifts of all of the Bragg gratings are at the same location of laser-active fiber 13 and are indicated by reference numeral 13.2.

The three wavelengths $\lambda_1$, $\lambda_2$, $\lambda_3$ may be selected as follows:
$\lambda_1$=1560 nm
$\lambda_2$=1547.11 nm
$\lambda_3$=1534.32 nm.

In this connection, the relationship between grating constants di (i=1 . . . 3) of the three Bragg gratings and respectively corresponding wavelengths $\lambda_i$ (i=1 . . . 3) is derived according to:

$$\lambda_i = 2 \cdot n_i \cdot d_i \tag{Equ. 1}$$

where $\lambda_i$ represents the emitted wavelength, $n_i$ represents the index of refraction of the laser-active fiber at wavelength $\lambda_i$, $d_i$ represents the grating constant of the Bragg grating, and i=1, 2, 3.

Given a refractive index $n_1=n_2=n_3=1.45$ of laser-active, erbium-doped fiber 13, then, for the wavelengths $\lambda_1$=1560 nm, $\lambda_2$=1547.11 nm, $\lambda_3$=1534.32 nm, for example, the following grating constants of the corresponding Bragg gratings result:
$d_1$=537.93 nm
$d_2$=533.49 nm
$d_3$=529.07 nm.

Figure 2:
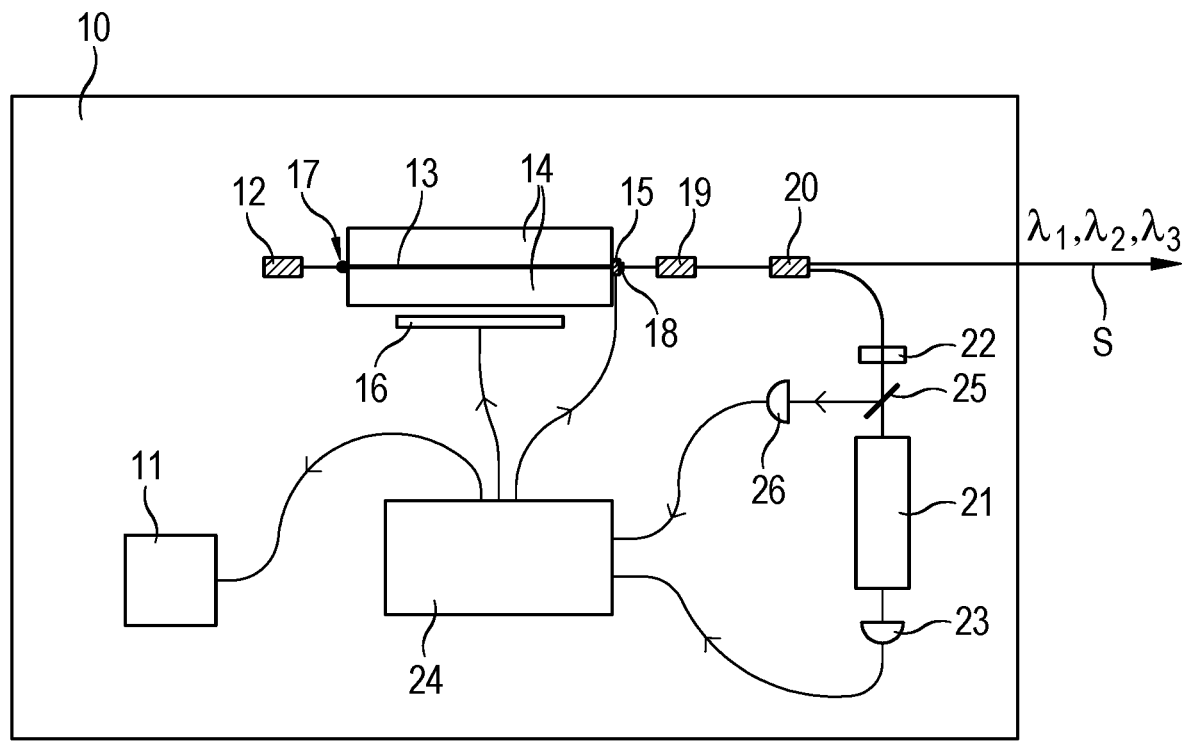
FIG. 2 schematically illustrates a multiple wavelength light source of the device illustrated in FIG. 1.
Figure 6:
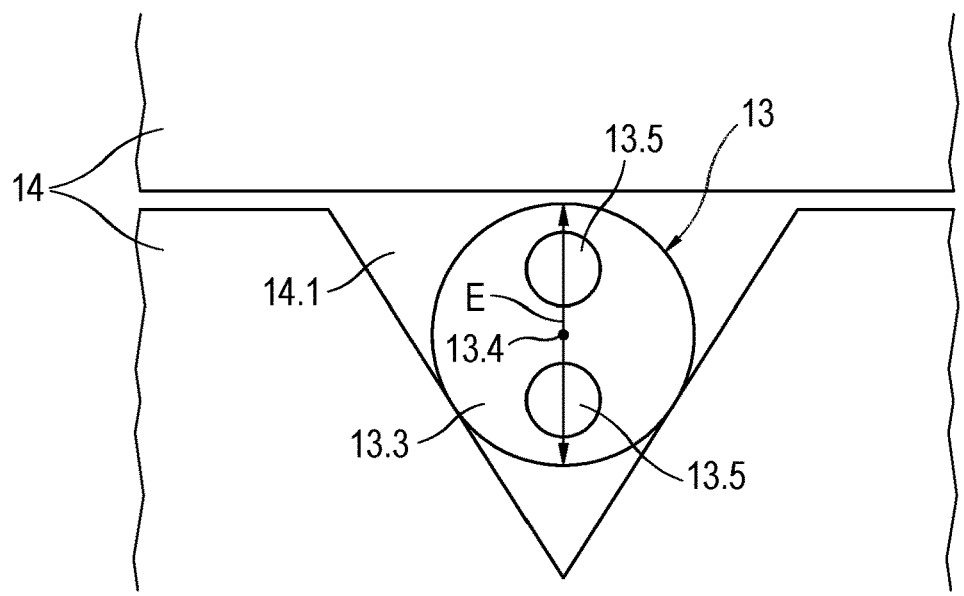
FIG. 6 is a cross-sectional view of the laser-active fiber in the multiple wavelength light source, which emits radiation in a specific polarization direction.

As illustrated in FIGS. 2, 3, and 6, laser-active fiber 13 is supported mechanically in a fiber holding device 14 that is provided in two pieces. As shown in the cross-sectional view of FIG. 6, the lower part of fiber holding device 14 includes a grooved or v-shaped recess 14.1, in which fiber 13 is supported. The upper part of fiber holding device 14 is plate-shaped and covers recess 14.1.

Fixing points, between which laser-active fiber 13 is mounted in tension in fiber holding device 14, are indicated by reference numerals 17, 18 in each of FIGS. 2 and 3. In this context, the region of fiber 13, in which the three Bragg gratings are situated or inscribed, that is, the laser-active region of fiber 13, is provided between fixing points 17, 18. In the region between fixing points 17, 18, it is considered advantageous to mount fiber 13 in fiber holding device 14 in a manner allowing vibration to be damped as much as possible. In the illustrated exemplary embodiment, this is accomplished by additionally placing damping media, such as high-viscosity oils, silicones, or adhesive agents, in recess 14.1 of fiber holding device 14. Fixing points 17, 18 may take the form of suitable mechanical clamping of fiber 13 in fiber holding device 14. Alternatively, fiber 13 may also be fixed in position by cementing fiber 13 to fixing points 17, 18.

In addition, in each instance, a piezoelectric actuator unit 15, as well as a tempering unit 16, are represented adjacent to the laser-active region of fiber 13 in FIGS. 2 and 3. As explained below, these components are used, for example, as control elements, upon which a control unit 24 acts to generate laser radiation having specific wavelengths $\lambda_1$, $\lambda_2$, $\lambda_3$. For this purpose, a portion of light beam S, which is emitted by laser-active fiber 13 and just passed through a pumping light filter 19 for filtering out the pumping wavelength, is fed through a filter 22 and an absorption cell 21 to a photodetector 23 with the aid of a coupling-out element 20, the output signals of the photodetector being supplied to control unit 24. The pumping light portion possibly still contained in light beam S is filtered out by pumping light filter 19, which, e.g., takes the form of a WDM coupler, in order that this portion does not enter into the subsequent signal path and, for instance, damage the optical components located there. Then, in order to act upon laser-active fiber 13, the mechanical tension on the laser-active region of the fiber 13 clamped in fiber holding device 14 may be changed selectively by control unit 24 with the aid of piezoelectric actuator unit 15. In addition, the temperature of the laser-active region of fiber 13 may be changed precisely, using tempering unit 16. Furthermore, there is still the option of acting upon the pump current of pumping light source 11 in a precise manner via control unit 24, in order to provide the exact frequency of desired wavelengths $\lambda_1$, $\lambda_2$, $\lambda_3$. For a more detailed explanation of the method of operation of control unit 24, reference is made to the subsequent description of FIG. 5.

As mentioned above, in the present exemplary embodiment, three Bragg gratings, whose respective constructions are matched to the three wavelengths $\lambda_1$, $\lambda_2$, $\lambda_3$ to be generated, are integrated and/or inscribed in laser-active fiber 13, i.e., in its fiber core. Specifically, in this connection, grating constants $d_1$, $d_2$, $d_3$ of the three Bragg gratings are selected suitably. Furthermore, as likewise mentioned above, one phase shift of magnitude $\pi$ is to be provided per designated Bragg grating, e.g., situated centrally or centrically in the Bragg grating.

In principle, there are several options with regard to the positioning in the laser-active fiber, of the three Bragg gratings provided in the present exemplary embodiment.

Corresponding variants are explained below in view of FIGS. 4a to 4d. In the upper part of each of the individual figures, the fiber having the grating resulting from the superpositioning of the individual Bragg gratings is illustrated, the grating having different grating sections as a function of the superpositioning variant. In the lower part of each of the Figures, it is schematically indicated how the different grating sections in the resulting grating in the fiber are produced from the respective, relative positioning or superpositioning of a plurality of individual Bragg gratings.

Figure 4A:
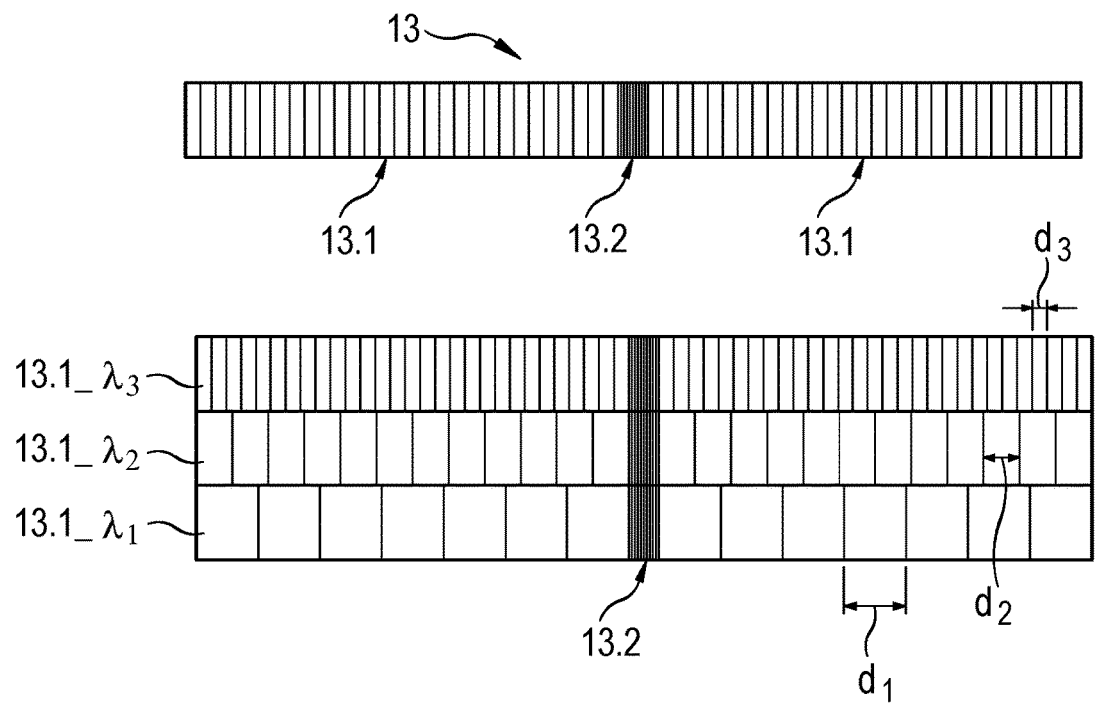
FIGS. 4a to 4d illustrate different variants regarding the relative positioning of a plurality of Bragg gratings in a laser-active fiber.

A first variant of a possible configuration of the three Bragg gratings in the laser-active fiber is illustrated in FIG. 4a. This variant corresponds to the one from the exemplary embodiment illustrated in FIG. 3. In the upper part of FIG. 4a, the grating resulting from the completely overlapping layout of the three individual Bragg gratings is designated by reference numeral 13.1. In this instance, the grating having a single central phase shift 13.2 of magnitude π. In the lower part of FIG. 4a, the three individual Bragg gratings 13.1_$\lambda_1$, 13.1_$\lambda_2$, 13.1_$\lambda_3$ are schematically illustrated, as they, in this variant, are positioned relative to each other in fiber 13. Both the grating constants d1, d2, d3 of the three Bragg gratings 13.1_$\lambda_1$, 13.1_$\lambda_2$, 13.1_$\lambda_3$ and the grating 13.1 in fiber 13 resulting from the superpositioning are not represented to scale. In principle, it should simply be stated that, as explained above, the three Bragg gratings 13.1_$\lambda_1$, 13.1_$\lambda_2$, 13.1_$\lambda_3$ have different grating constants $d_1$, $d_2$, $d_3$ as a function of the wavelengths $\lambda_1$, $\lambda_2$, $\lambda_3$ to be generated.

In this connection, in the variant illustrated in FIG. 4a, it is provided that the three Bragg gratings 13.1_$\lambda_1$, 13.1_$\lambda_2$, 13.1_$\lambda_3$ are arranged in laser-active fiber 13 so as to overlap completely along the fiber extension direction. Therefore, the phase shifts of individual Bragg gratings 13.1_$\lambda_1$, 13.1_$\lambda_2$, 13.1_$\lambda_3$ coincide, and the grating in fiber 13 resulting from the superpositioning has a central phase shift 13.2. In the grating 13.1 resulting from the superpositioning of the three Bragg gratings 13.1_$\lambda_1$, 13.1_$\lambda_2$, 13.1_$\lambda_3$, the grating constants and/or grating frequencies of individual Bragg gratings 13.1_$\lambda_1$, 13.1_$\lambda_2$, 13.1_$\lambda_3$ are additionally present over the complete length. Such overlapping Bragg grating layouts may be produced, for example, by additively superimposing the refractive index modulations of individual Bragg gratings 13.1_$\lambda_1$, 13.1_$\lambda_2$, 13.1_$\lambda_3$.

In contrast to the variant illustrated in FIG. 4a, in the variants for positioning the three Bragg gratings in the laser-active fiber, which are explained below with reference to FIGS. 4b to 4d, in each instance, the three Bragg gratings are positioned so as to be displaced with respect to each other along the fiber extension direction, by particular offset distances V. In the different variants, offset distances V differ in each instance. Then, in contrast to FIG. 4a, in these variants, the phase shifts of the individual Bragg gratings are likewise displaced with respect to each other along the fiber extension direction, by corresponding offset distances V.

Figure 4B:
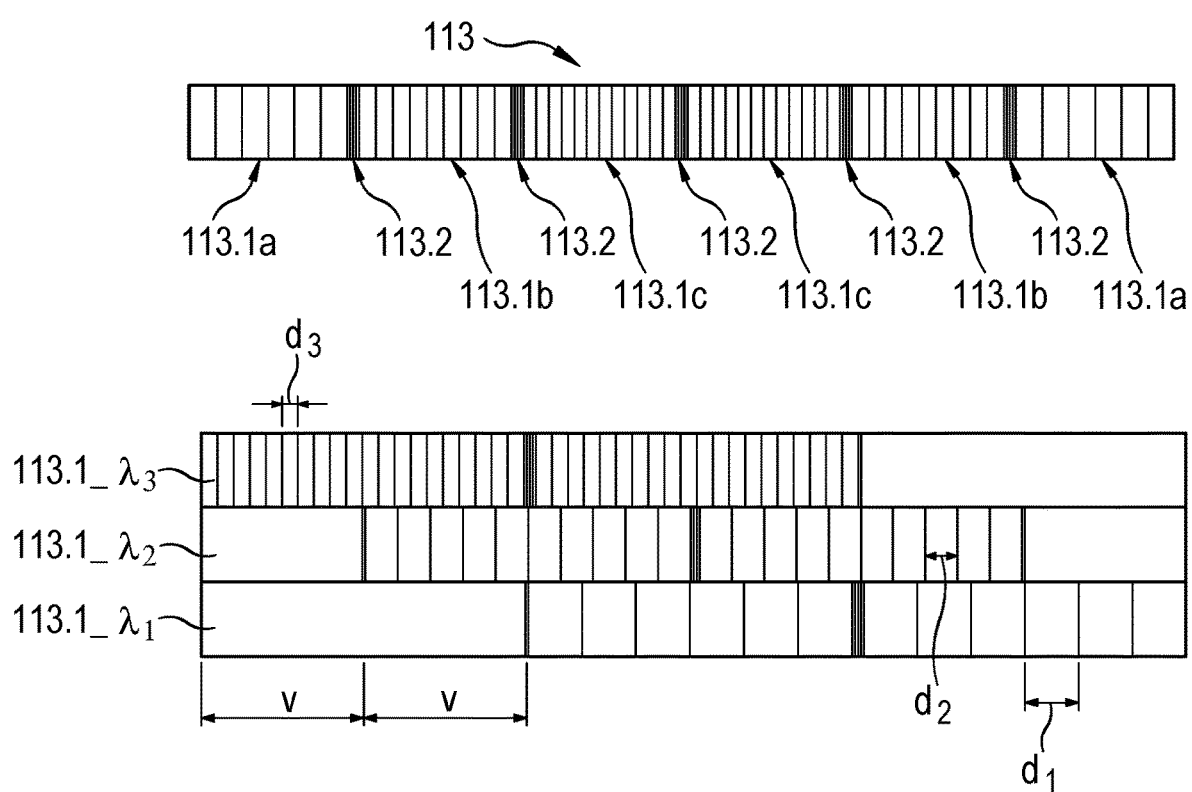

In the second variant of the possible positioning of the three Bragg gratings 113.1_$\lambda_1$, 113.1_$\lambda_2$, 113.1_$\lambda_3$ in laser-active fiber 113 illustrated in FIG. 4b, it is provided that an offset distance V between 0% and 50% of the grating length of a Bragg grating 113.1_$\lambda_i$ is set between adjacent Bragg gratings 113.1_$\lambda_1$, 113.1_$\lambda_2$, 113.1_$\lambda_3$. In this connection, the three different Bragg gratings 113.1_$\lambda_1$, 113.1_$\lambda_2$, 113.1_$\lambda_3$ each have the same effective grating length along the fiber extension direction. In this context, the effective grating length should be understood to be the length of Bragg gratings 113.1_$\lambda_i$ along the longitudinal direction of the grating, which length is effective for the specific wavelength. In this connection, the effective grating length does not correspond to the mechanical length of Bragg gratings 113.1_$\lambda_i$, but is derived by multiplying the mechanical length by a scaling factor and the refractive index deviation of the grating.

In the example illustrated in FIG. 4b, in comparison with Bragg grating 113.1_$\lambda_3$, Bragg grating 113.1_$\lambda_2$ is positioned so as to be displaced to the right in fiber 113 by an offset distance V of approximately 25% of the effective grating length of Bragg gratings 113.1_$\lambda_i$. In comparison with Bragg grating 113.1_$\lambda_2$, Bragg grating 113.1_$\lambda_1$ is likewise positioned so as to be displaced to the right in fiber 113 by approximately 25% of the effective grating length of Bragg grating 13.1_$\lambda_i$.

Therefore, different first, second and third grating sections 113.1a, 113.1b, 113.1c are produced in the grating in fiber 113 resulting from the superpositioning, as illustrated in the upper part of FIG. 4b. In this context, due to the provided, relative positioning of individual Bragg gratings 113.1_$\lambda_1$, 113.1_$\lambda_2$, 113.1_$\lambda_3$, first grating sections 113.1a include Bragg gratings 113.1_$\lambda_1$, 113.1_$\lambda_2$, 113.1_$\lambda_3$ having only one grating constant. Second grating sections 113.1b result from the overlapping layout of two Bragg gratings 113.1_$\lambda_1$, 113.1_$\lambda_2$, 113.1_$\lambda_3$, each having two different grating constants. Finally, third grating sections 113.1c result from the overlapping configuration of three Bragg gratings 113.1_$\lambda_1$, 113.1_$\lambda_2$, 113.1_$\lambda_3$, each having three different grating constants.

Figure 4C:
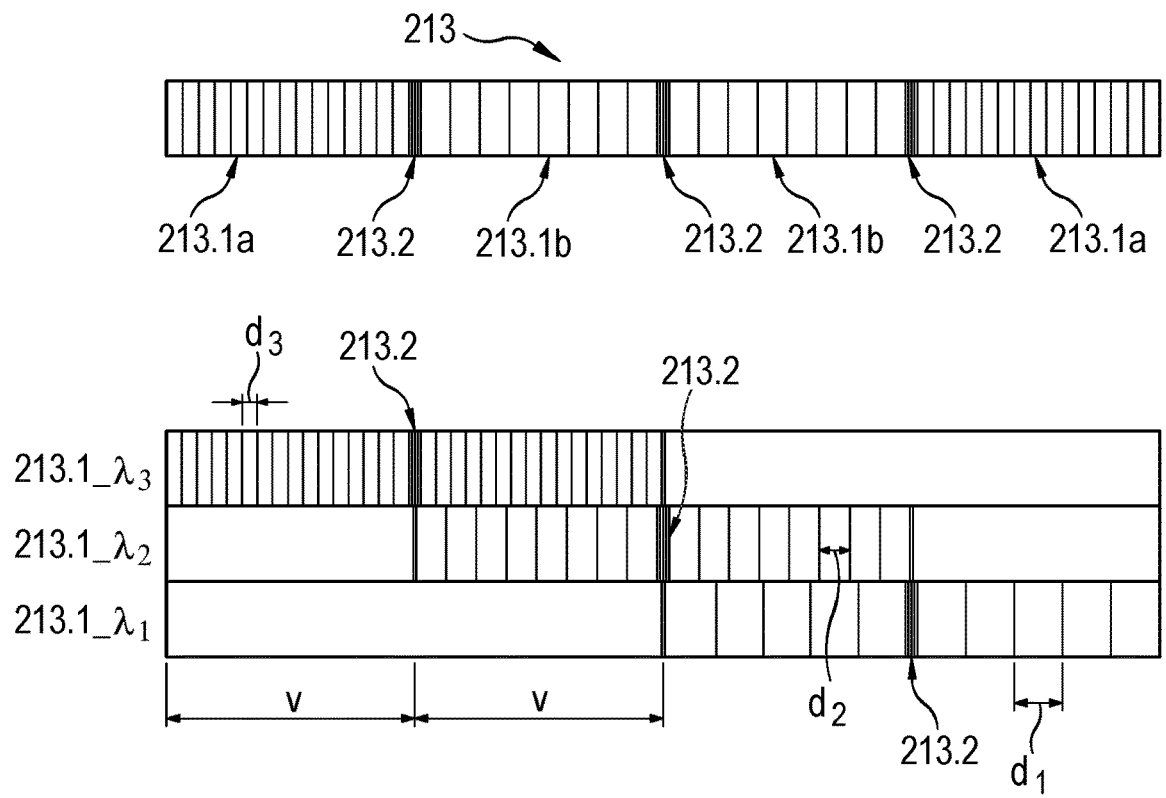
Figure 4D:
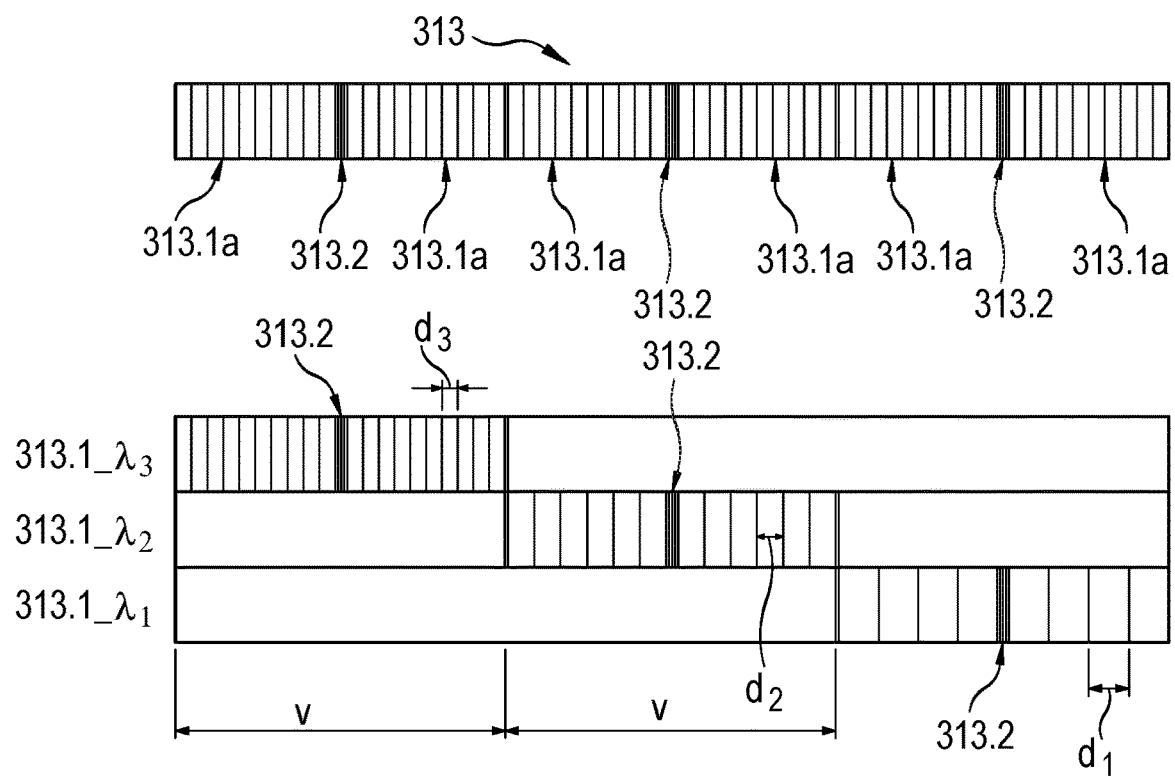

A further variant of the possible positioning of the three Bragg gratings 213.1_$\lambda_1$, 213.1_$\lambda_2$, 213.1_$\lambda_3$ in laser-active fiber 213 is illustrated in FIG. 4c in a manner analogous to the preceding variants. In this instance, an offset distance V between 50% and 100% of the effective grating length of Bragg gratings 213.1_$\lambda_i$, between adjacent Bragg gratings 213.1_$\lambda_1$, 213.1_$\lambda_2$, 213.1_$\lambda_3$ is provided. Thus, for instance, in comparison with Bragg grating 113.1_$\lambda_3$, Bragg grating 213.1_$\lambda_2$ is positioned so as to be displaced to the right in fiber 213 by 50% of the effective grating length of a Bragg grating 213.1_$\lambda_i$. In comparison with Bragg grating 213.1_$\lambda_2$, Bragg grating 213.1_$\lambda_1$ is likewise positioned so as to be displaced to the right in fiber 213 by an offset distance V of approximately 50% of the effective grating length of a Bragg grating 213.1_$\lambda_i$. Therefore, different first and second grating sections 213.1a, 213.1b are produced in the grating in fiber 213 resulting from the superpositioning, as illustrated in the upper part of FIG. 4b. In this context, due to the provided, relative positioning of individual Bragg gratings 213.1_$\lambda_1$, 213.1_$\lambda_2$, 213.1_$\lambda_3$, first grating sections 213.1a include Bragg gratings 213.1_$\lambda_1$, 213.1_$\lambda_2$, 213.1_$\lambda_3$, each having only one grating constant. Second grating sections 213.1b result from the overlapping configuration of two Bragg gratings 213.1_$\lambda_1$, 213.1_$\lambda_2$, 213.1_$\lambda_3$, each having two different grating constants.

A fourth variant for possible positioning of the three Bragg gratings 313.1_$\lambda_1$, 313.1_$\lambda_2$, 313.1_$\lambda_3$ in laser-active fiber 313 is illustrated in FIG. 4c in a manner analogous to the preceding variants. In this instance, an offset distance V of 100% of the effective grating length of a Bragg grating 213.1_$\lambda_i$, between adjacent Bragg gratings 313.1_$\lambda_1$, 313.1_$\lambda_2$, 313.1_$\lambda_3$ is to be set. Thus, for instance, in comparison with Bragg grating 313.1_$\lambda_3$, Bragg grating 313.1_$\lambda_2$ is positioned so as to be displaced to the right in fiber 313 by an offset distance V of 100% of the effective grating length of a Bragg grating 313.1_$\lambda_i$. In comparison with Bragg grating 313.1_$\lambda_2$, Bragg grating 313.1_$\lambda_1$ is likewise positioned so as to be displaced to the right in fiber 313 by 100% of the effective grating length of a Bragg grating 313.1_$\lambda_i$. Therefore, grating sections 313.1a are exclusively produced in the grating in fiber 313 resulting from the superposition, is illustrated in the upper part of FIG. 4b. In this context, due to the provided, relative positioning of individual Bragg gratings 313.1_$\lambda_1$, 313.1_$\lambda_2$, 313.1_$\lambda_3$, all grating sections 313.1a include Bragg gratings, each having only one grating constant.

In view of the positioning of laser-active fiber 13 in fiber holding device 14, in each of the variants explained above, it should be ensured that the region of fiber 13, in which all of the Bragg gratings are situated, is positioned between fixing points 17, 18.

Figure 5:
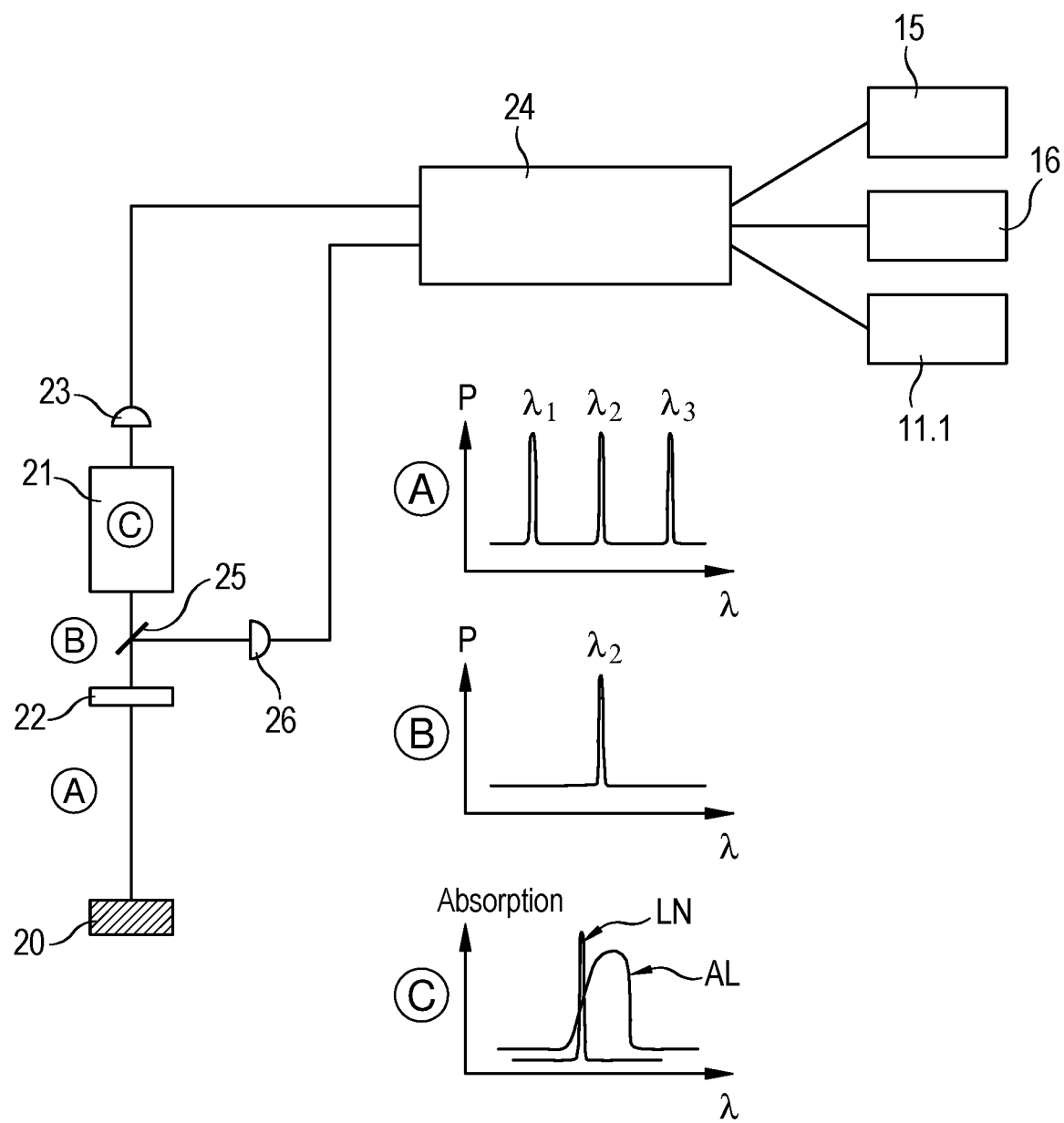
FIG. 5 is a schematic view explaining the control of the multiple wavelength light source.

A suitable control for multiple wavelength light source 10 of the interferometric distance measurement device, by which the three desired wavelengths $\lambda_1$, $\lambda_2$, $\lambda_3$ may be provided on the output side, is explained below with reference to the schematic illustration provided in FIG. 5.

In this connection, a portion of the multiple wavelength light source 10 illustrated in FIG. 2, e.g., the signal processing between coupling-out element 20 and the different control elements in the form of current source 11.1 of the pumping light source, piezoelectric actuator unit 15, and tempering unit 16, is illustrated in enlarged form.

As explained above, a portion of the light beam emitted by the laser-active fiber is coupled out by coupling-out element 20, e.g., taking the form of a fiber splitter, at a coupling-out ratio of 99:1 or 90:10. After the coupling-out, the three actual wavelengths $\lambda_1$, $\lambda_2$, $\lambda_3$ produced are initially present in beam region A, as illustrated in FIG. 5. The coupled-out portion of the beam is then supplied to a filter 22, which takes the form of, e.g., an interference filter and is only transparent to desired wavelength $\lambda_2$. Therefore, after the transiting of filter 22, only actual wavelength $\lambda_2$ from emitted light beam S is present in beam region B, the actual wavelength subsequently being supplied to an absorption cell 21. Absorption cell 21 takes the form of an acetylene or HCN cell and has an absorption line AL illustrated in section C of FIG. 5.

In the case of a variation of wavelength $\lambda_2$, the shape of absorption line AL is covered virtually by a narrow laser needle LN. If the resulting signal at downstream photodetector 23 is plotted versus the wavelength, then one is measuring the shape of the absorption line. If one is at the middle of an edge of the absorption line, then a change in wavelength produces an increase or a decrease of the output signal of absorption cell 21 at downstream photodetector 23.

Thus, the radiation passing through absorption cell 21 represents a measure of the difference between actual wavelength $\lambda_2$ and necessary, desired wavelength $\lambda_2$. The corresponding optical control signal is subsequently supplied to a photodetector 23, which converts the optical control signal to an electrical control signal in the form of a current signal, which is subsequently fed to control unit 24. In addition, control unit 24 is supplied a reference signal, which is generated by a photoelectric cell 26, which radiation coupled out of beam region B by a coupling-out element 25 reaches. In this manner, fluctuations in the light intensity may be corrected in control unit 24.

Control unit 24 includes, for example, a PID controller and generates the necessary control variable at its output, in order to act upon one or more of the provided control elements and, in this manner, to set desired wavelengths $\lambda_1$, $\lambda_2$, $\lambda_3$. As mentioned above, current source 11.1 for the pumping light source, piezoelectric actuator unit 15, as well as tempering unit 16, are provided in the multiple wavelength light source as control elements, upon which control unit 24 acts. At the same time, all of the wavelengths $\lambda_1$, $\lambda_2$, $\lambda_3$ of the laser radiation emitted by the fiber laser may be changed selectively via the specific action upon each of these control elements. For example, a 1% strain of the fiber with the aid of piezoelectric actuator unit 15 causes a 1% change in each of all three wavelengths $\lambda_1$, $\lambda_2$, $\lambda_3$, etc.

In this context, the different control elements are used in order to correct different time constants. In this manner, for instance, very rapid wavelength fluctuations in the range of more than 10 kHz may be corrected with the aid of current source 11.1 for the pumping light source. Piezoelectric actuator unit 15 is used to correct wavelength fluctuations in the range between 1 Hz and 10 KHz, and tempering unit 16 is used to correct very slow wavelength fluctuations.

Therefore, the multiple wavelength light source may be adjusted to intended, desired wavelength $\lambda_2$ in the manner delineated above. In this context, at the same time, it is provided that adjustment to the further, necessary wavelengths $\lambda_1$, $\lambda_2$, $\lambda_3$ may also be made on the basis of the configuration of the laser-active fiber explained above and the simultaneous action of the control elements on all of the Bragg gratings. Consequently, it is possible to adjust all three wavelengths $\lambda_1$, $\lambda_2$, $\lambda_3$ in a precise manner. An electrical signal, which is derived from an optical signal of only one of the three wavelengths $\lambda_1$, $\lambda_2$, $\lambda_3$, acts as an input signal of control unit 24. Therefore, markedly simplified control of the multiple wavelength light source in the interferometric distance measurement device is achieved in comparison with a light source having three individual lasers and the three control units thereby required.

In connection with the description of the multiple wavelength light source of the interferometric distance measurement device, reference is made to FIG. 6, which shows a cross-sectional view of laser-active fiber 13 in two-part fiber holding device 14. In this view, fiber cladding 3.3 and fiber core 13.4 of the laser-active fiber, as well as stress elements 13.5, are illustrated. Using stress elements 13.5, which are melted into fiber 13 during the manufacturing process, it is provided that fiber 13 acts to maintain polarization for the transmitted light.

In FIG. 6, the polarization axis of the laser radiation emitted by fiber 13 is also indicated by reference character E. As mentioned above, multiple wavelength light source 10 emits laser radiation having a specific polarization. In the present example, so-called slow polarization axis E is used.

The configuration of a detection unit 40, which may be used in the interferometric distance measurement device, is explained with reference to FIG. 7.

Figure 7:
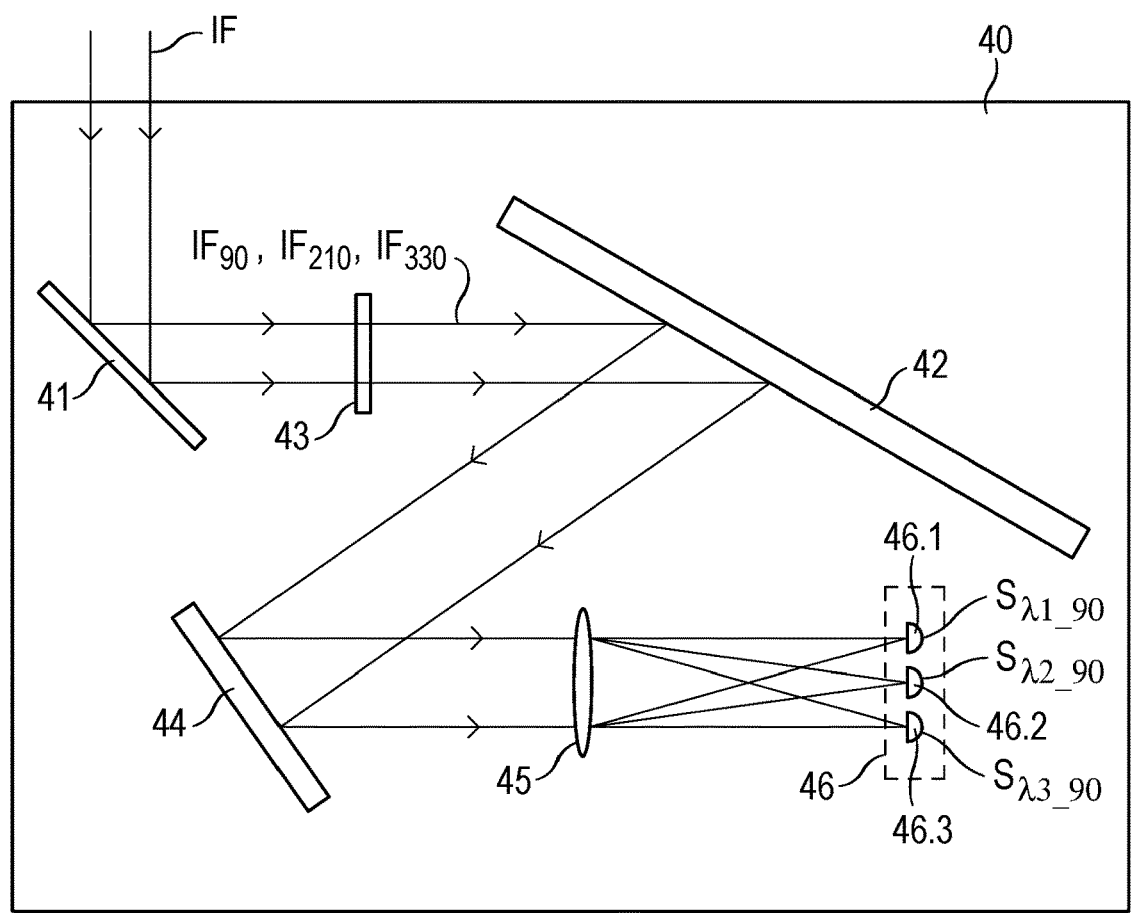
FIG. 7 schematically illustrates a detection unit of the device illustrated in FIG. 1.

As illustrated in FIG. 7, interference light beam IF, which is produced by the interferometer unit and is made up of a rotating, linearly polarized E-field after the transit of $\lambda/4$ plate 35, strikes detection unit 40. There, using a first splitter element 41 and a downstream polarization element 43, interference light beam IF is split up into three interference light beams $IF_{90}$, $IF_{210}$, $IF_{330}$ phase-shifted with respect to each other. In this connection, first splitter element 41 takes the form of a reflecting phase grating, which initially splits up the interference light beam IF incident upon it into three spatially separated interference light beams. Polarization element 43 includes three linear polarization filters having polarization directions rotated, in each instance, 60° relative to each other, and causes the three interference light beams separated by splitter element 41 to be converted into three interference light beams $IF_{90}$, $IF_{210}$, $IF_{330}$ phase-shifted, in each instance, by 120°. The splitting-up into the three phase-shifted interference light beams $IF_{90}$, $IF_{210}$, $IF_{330}$ via first splitter element 41 and polarization element 42 occurs perpendicularly to the drawing plane. That is, in FIG. 7, the three split interference light beams $IF_{90}$, $IF_{210}$, $IF_{330}$ present downstream from polarization element 43 are not recognizable individually. The three interference light beams $IF_{90}$, $IF_{210}$, $IF_{330}$ then strike a second splitter element 42, which also takes the form of a reflecting phase grating. A wavelength-dependent splitting of the three phase-shifted interference light beams $IF_{90}$, $IF_{210}$, $IF_{330}$ results via second splitter element 42, which means that, in each instance, three phase-shifted partial interference light beams are subsequently present per wavelength $\lambda_1$, $\lambda_2$, $\lambda_3$, and thus, a total of nine partial interference light beams, which are not depicted individually in FIG. 7. The partial interference light beams then reach a detector array 46 via a deflector element 44 and an imaging optical system 45, the detector array including nine electro-optical detector elements 46.1 to 46.3, and only a portion of the same being illustrated in FIG. 7. In this connection, imaging optical system 45 takes the form of an individual lens or a lens array, and as an alternative, may also be combined with deflector element 44 in a single component. With the aid of detector array 46 or its detector elements 46.1 to 46.9, the nine partial interference light beams are detected and converted into nine electrical, partial interference signals $S_{\lambda 1\_90}$, $S_{\lambda 1\_210}$, $S_{\lambda 1\_330}$, $S_{\lambda 2\_90}$, $S_{\lambda 2\_210}$, $S_{\lambda 2\_330}$, $S_{\lambda 3\_90}$, $S_{\lambda 3\_210}$, $S_{\lambda 3\_330}$, which are then processed further in the signal processing unit. In this context, only the three partial interference signals $S_{\lambda 1\_90}$, $S_{\lambda 2\_90}$, $S_{\lambda 3\_90}$ of the total of nine generated partial interference signals $S_{\lambda 1\_90}$, $S_{\lambda 1\_210}$, $S_{\lambda 1\_330}$, $S_{\lambda 2\_90}$, $S_{\lambda 2\_210}$, $S_{\lambda 2\_330}$, $S_{\lambda 3\_90}$, $S_{\lambda 3\_210}$, $S_{\lambda 3\_330}$ are illustrated in FIG. 7.

As an alternative to the variant illustrated in FIG. 7, detection unit 40 may also be formed particularly compactly in the shape of a single monolithic component made of glass. The different optically relevant components, such as, in particular, the two splitter elements, the polarization element, the imaging optical system, as well as deflector elements possibly necessary, are integrated into this component.

In addition, it is possible for detection unit 40 to include only a single splitter element, which, in this case, is formed as a two-dimensional grating in the shape of a cross-grating. Over it, the at least 3 wavelengths are separated in a first splitter direction, via a very fine grating, which has, e.g., a grating period of less than 2 μm. In a second splitting direction, the at least three partial interference light beams are then split up by a coarse grating having, e.g., a grating period greater than 10 μm, before these then pass through the polarization elements, in order to produce the nine partial interference signals $S_{\lambda 1\_90}$, $S_{\lambda 1\_210}$, $S_{\lambda 1\_330}$, $S_{\lambda 2\_90}$, $S_{\lambda 2\_210}$, $S_{\lambda 2\_330}$, $S_{\lambda 3\_90}$, $S_{\lambda 3\_210}$, $S_{\lambda 3\_330}$ in this manner.

Furthermore, as an alternative to the depicted variant of the detection unit, integrated fiber optic wavelength splitting may be accomplished with the aid of so-called WDM demultiplexers. In this connection, interference light beam IF is initially split up into three spatially separated interference light beams by a suitable splitter device. The interference light beams then pass through a polarization element, which includes three linear polarization filters having, in each instance, polarization directions rotated by 60° relative to each other. These cause the three interference light beams separated by the splitter element to be converted into three interference light beams phase-shifted, in each instance, by 120°. Subsequently, these are each then coupled into an optical fiber, using lenses, e.g., implemented as a diffractive lens array including two offset lenses and one normal diffractive lens. That is, the three interference light beams are guided in three separate optical fibers, which are each connected to so-called wavelength division multiplexers that assume the splitting-up into the three wavelengths. Thus, three optical fibers lead out of each wavelength division multiplexer, the optical fibers guiding the light to nine detector elements of the detector array.

In general, interference light beam IF is split up in detection unit 40, into at least three groups of interference light beams $IF_{90}$, $IF_{210}$, $IF_{330}$ as a function of wavelength, using the at least one splitter element and the at least one polarization element. Each of the at least three groups of interference light beams $IF_{90}$, $IF_{210}$, $IF_{330}$ includes, in each instance, at least three phase-shifted, partial interference light beams.

Figure 8:
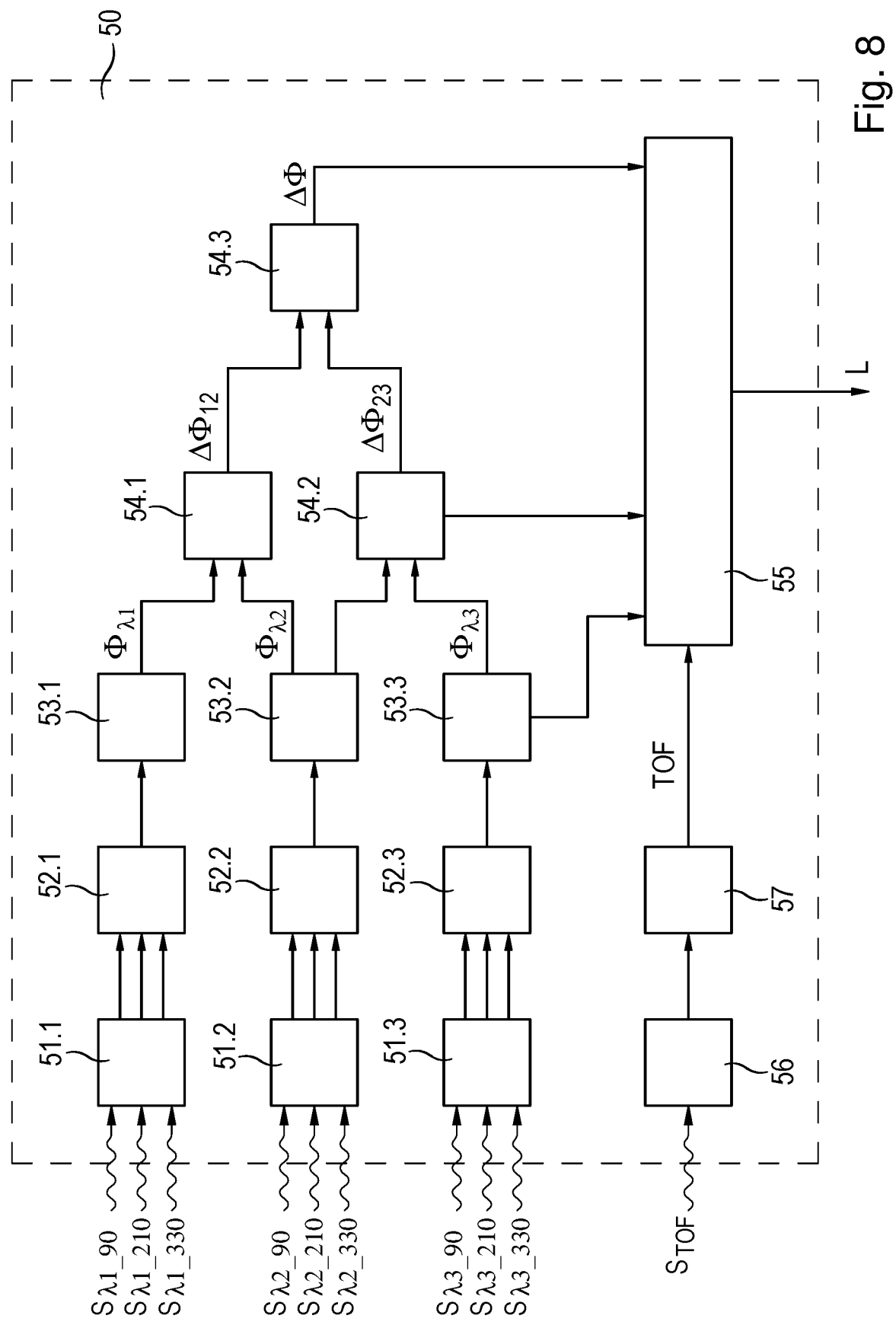
FIG. 8 schematically illustrates a signal processing unit of the device illustrated in FIG. 1.

The further processing of partial interference signals $S_{\lambda 1\_90}$, $S_{\lambda 1\_210}$, $S_{\lambda 1\_330}$, $S_{\lambda 2\_90}$, $S_{\lambda 2\_210}$, $S_{\lambda 2\_330}$, $S_{\lambda 3\_90}$, $S_{\lambda 3\_210}$, $S_{\lambda 3\_330}$ and the determination of an absolute position information item regarding the measuring reflector takes place with the aid of signal processing unit 50, which is schematically illustrated in FIG. 8; its configuration and a method usable for evaluation are explained below.

Prior to the description of the evaluation method, it is explained how, in the present example, different wavelengths $\lambda_1$, $\lambda_2$, $\lambda_3$, which are emitted by the multiple wavelength light source of the interferometric distance measurement device according to the present invention, may be selected.

Thus, a first wavelength $\lambda_1$, which corresponds to the highest incremental resolution of the position measurement, is initially set. The two further wavelengths $\lambda_2$, $\lambda_3$ are then selected according to the two following conditions 2a, 2b:

$$\lambda_2 = \frac{CAF_1}{CAF_1 \pm 1} \cdot \lambda_1 \qquad \text{(equ. 2a)}$$

$$\lambda_3 = \frac{\lambda_1 \cdot \lambda_2}{\lambda_1 \pm \lambda_2 \cdot \frac{CAF_2 \pm 1}{CAF_1 \cdot CAF_2}} \qquad \text{(equ. 2b)}$$

In this connection, variables $CAF_1$ and $CAF_2$ from the two equations 2a, 2b are determined as follows:

$$CAF_1 = \frac{\Lambda_1}{\lambda_1} \qquad \text{(equ. 3a)}$$

$$CAF_2 = \frac{\Lambda_3}{\lambda_1} \qquad \text{(equ. 3b)}$$

where $\lambda_1$, $\lambda_2$, $\lambda_3$ represent the emitted wavelengths of the multiple wavelength light source.

Variables $CAF_1$, $CAF_2$ are may be selected to be in the range between 10 and 200.

Variables $\Lambda_1$, $\Lambda_2$, $\Lambda_3$ from equations 3a, 3b are also referred to below as first synthetic wavelength $\Lambda_1$, second synthetic wavelength $\Lambda_2$, and third synthetic wavelength $\Lambda_3$, these variables being determined as follows:

$$\Lambda_1 = \left|\frac{\lambda_1 \cdot \lambda_2}{\lambda_1 - \lambda_2}\right| = CAF_1 \cdot \lambda_1 \qquad \text{(equ. 4a)}$$

$$\Lambda_3 = \left|\frac{\Lambda_2}{\Lambda_1 - \Lambda_2}\right| \cdot \Lambda_1 = CAF_2 \cdot \Lambda_1 \qquad \text{(equ. 4b)}$$

$$\Lambda_2 = \left|\frac{\lambda_2 \cdot \lambda_3}{\lambda_2 - \lambda_3}\right| \qquad \text{(equ. 4c)}$$

Consequently, third synthetic wavelength $\Lambda_3$ results as a beat from first and second synthetic wavelengths $\Lambda_1$, $\Lambda_2$. For example, a first wavelength $\lambda_1=1.560$ μm having a signal period $SP_{\lambda 1}=0.78$ μm may be selected. With variables $CAF_1=CAF_2=120$, then, for first and third synthetic wavelengths $\Lambda_1$, $\Lambda_3$, signal periods $SP_{\Lambda 1}\approx 93.6$ μm and $SP_{\Lambda 3}\approx 11.232$ mm are obtained. For example, for a Michelson interferometer having a retroreflector, $2\cdot SP_{\Lambda i}=\Lambda_i$, and $2\cdot SP_{\lambda 1}=\lambda_1$ generally apply, with i=1 ... 3.

In the evaluation method in signal processing unit 50, after a rough position determination of the movable measuring reflector, the cascaded or stepwise determination of absolute distance L between the movable measuring reflector and the stationary interferometer components is carried out with the aid of first wavelength $\lambda_1$, as well as first and third synthetic wavelengths $\Lambda_1$ and $\Lambda_3$. The corresponding procedure is explained below.

In signal processing unit 50, the partial interference signals $S_{\lambda 1\_90}$, $S_{\lambda 1\_210}$, $S_{\lambda 1\_330}$, $S_{\lambda 2\_90}$, $S_{\lambda 2\_210}$, $S_{\lambda 2\_330}$, $S_{\lambda 3\_90}$, $S_{\lambda 3\_210}$, $S_{\lambda 3\_330}$ generated by the detection unit are initially amplified by amplifiers 51.1, 51.2, 51.3 and digitized by analog-to-digital converters 52.1, 52.2, 52.3. For each wavelength $\lambda_1$, $\lambda_2$, $\lambda_3$, a phase value $\Phi_{\lambda 1}$, $\Phi_{\lambda 2}$, $\Phi_{\lambda 3}$ is then calculated by phase computation units 53.1 to 53.3. Consequently, the differential phases $\Delta\Phi_{12}$, $\Delta\Phi_{23}$, and $\Delta\Phi$ belonging to the different synthetic wavelengths $\Lambda_1$, $\Lambda_2$, $\Lambda_3$ are ascertained from phase values $\Phi_{\lambda 1}$, $\Phi_{\lambda 2}$, $\Phi_{\lambda 3}$ with the aid of differential phase computation units 54.1, 54.2, 54.3, in the manner specified below.

Thus, for the first synthetic wavelength $\lambda_1$, corresponding differential phase $\Delta\Phi_{12}$ is determined by differential phase computation unit 54.1 as follows:

$$\Delta\Phi_{12}=\Phi_{\lambda 1}-\Phi_{\lambda 2} \quad\quad\quad\quad (\text{equ. 5a})$$

For the second synthetic wavelength $\Lambda_2$, differential phase $\Delta\Phi_{23}$ is determined with the aid of differential phase computation unit 54.2 according to:

$$\Delta\Phi_{23}=\Phi_{\lambda 2}-\Phi_{\lambda 3} \quad\quad\quad\quad (\text{equ. 5b})$$

From the two differential phases $\Delta\Phi_{12}$, $\Delta\Phi_{23}$ ascertained in such a manner, differential phase $\Delta\Phi$ of third synthetic wavelength $\Lambda_3$ is determined by differential phase computation unit 54.3 as follows:

$$\Delta\Phi=\Delta\Phi_{12}-\Delta\Phi_{23} \quad\quad\quad\quad (\text{equ. 5c})$$

The two differential phases $\Delta\Phi_{12}$ and $\Delta\Phi$ of first and third synthetic wavelengths $\Lambda_1$, $\Lambda_3$ ascertained in the manner explained above are transferred to a position determination unit 55, just as phase value $\Phi_{\lambda 1}$ of wavelength $\lambda_1$.

As mentioned above, a rough absolute position determination of the measuring reflector is to be undertaken initially to determine the absolute position. This may be accomplished, for example, using a transit time measurement between the measuring reflector and the stationary components of the interferometer unit. For such a transit time measurement, light pulses are transmitted to the movable measuring reflector, and the photons $S_{TOF}$ reflected from there are converted to current pulses by a photoelectric cell 56. A time-to-digital converter unit 57 positioned downstream from photoelectric cell 56 allows the times of the current pulses and, consequently, the transit time to be determined accurately. In this context, with regard to the rough position determination, an accuracy in the range of several mm, which is theoretically possible by transit time measurement, is sufficient. The rough position signal TOF generated in this manner is supplied to position determination unit 55, as well.

On the basis of supplied signals TOF, $\Delta\Phi_{23}$, $\Delta\Phi$, and $\Phi_{\lambda 1}$, the determination of absolute distance L is performed in position determination unit 55 in cascaded form in the manner explained below.

In this connection, in a first step, the absolute position, i.e., absolute distance $L_{TOF}$ of the measuring reflector is determined, using the implemented rough position measurement and the rough position signal TOF thereby generated, with an accuracy that is less than half of signal period $SP_{\Lambda 3}$ of third synthetic wavelength $\Lambda_3$, and therefore, in the present example, with an accuracy of less than 5 mm.

In the next step, absolute distance $L_{\Lambda 3}$ of the measuring reflector is determined, using differential phase $\Delta\Phi$ of third synthetic wavelength $\Lambda_3$. This is accomplished with an accuracy, which is less than half of signal period $SP_{\Lambda 2}$ of the next smaller signal period $SP_{\Lambda 1}$ of first synthetic wavelength $\Lambda_1$, e.g., less than 45 μm in the present example. In this context, absolute distance $L_{\Lambda 3}$ is ascertained as follows:

$$L_{\Lambda 3}=\frac{\Delta\Phi}{2\pi}\cdot SP_{\Lambda 3}+N\cdot SP_{\Lambda 3} \quad\quad\quad\quad (\text{equ. 6a})$$

In this connection, variable N is determined, using the value for $L_{TOF}$ ascertained in the previous step, according to:

$$N=\text{Round}\left(\frac{L_{TOF}}{SP_{\Lambda 3}}\right) \quad\quad\quad\quad (\text{equ. 6b})$$

In equation 6b, rounding to a whole number is performed, using rounding function Round.

In the following step, absolute distance $L_{\Lambda 1}$ of the measuring reflector is then determined with the aid of differential phase $\Delta\Phi_{12}$ of first synthetic wavelength $\Lambda_1$. This is accomplished with an accuracy, which is less than half of signal period $SP_{\lambda 1}$ of first wavelength $\lambda_1$, thus, e.g., less than 390 nm in the present example. In this context, absolute distance $L_{\Lambda 1}$ is ascertained as follows:

$$L_{\Lambda 1}=\frac{\Delta\Phi_{12}}{2\pi}\cdot SP_{\Lambda 1}+M\cdot SP_{\Lambda 1}. \quad\quad\quad\quad (\text{equ. 7a})$$

In this context, variable M is obtained as follows, using the value for $L_{\Lambda 3}$ ascertained in the previous step according to the following equation:

$$M=\text{Round}\left(\frac{L_{\Lambda 3}}{SP_{\Lambda 1}}\right). \quad\quad\quad\quad (\text{equ. 7b})$$

In the final step, using phase value $\Phi_{\lambda 1}$, absolute distance L is then determined with the highest available accuracy, namely, with the resolution of first wavelength $\lambda_1$. In this context, absolute distance L is determined as follows:

$$L=\frac{\Phi_{\lambda 1}}{2\pi}\cdot SP_{\lambda 1}+n\cdot SP_{\lambda 1}. \quad\quad\quad\quad (\text{equ. 8a})$$

In this context, variable n is obtained as follows, using the value for $L_{\Lambda 1}$ ascertained in the previous step according to equation 6a:

$$n = \text{Round}\left(\frac{L_{\Lambda_1}}{SP_{\lambda_1}}\right). \qquad \text{(equ. 8b)}$$

The absolute distance L ascertained in position determination unit 55 in this manner may then be transferred by signal processing unit 50 to subsequent electronics, for further processing.

The foregoing description should not be considered limiting, since there are modifications that may be made without departing from the spirit and scope hereof.

For example, with the aid of the multiple wavelength light source, it is possible to generate more than three different wavelengths, in order to use these in a suitable absolute interferometric method for position determination.

In the multiple wavelength light source, in place of integrating the Bragg gratings in a single laser-active fiber, a plurality of fibers may also be situated parallelly to each other in the fiber holding device, and only one Bragg grating may be integrated into each fiber.

As an alternative to the transit time measurement described above for the rough absolute position determination, other measuring methods may also be used. For example, in the case of use of the interferometric distance measurement device in a machine tool, the position measuring devices present in the machine tool may be used for a rough position determination.

In addition, instead of erbium, the laser-active fiber may also be doped with other dopants, such as ytterbium, thulium, a combination of erbium and ytterbium, etc. Furthermore, the laser-active fiber may also take the form of a non-polarization-maintaining fiber, as well as a polarizing fiber that only carries one polarization.

It is also possible to generate four partial interference signals, each phase-shifted by 90°, in place of three partial interference signals, each phase-shifted by 120°.

In addition to the above-mentioned use in measuring and/or calibrating tasks, the interferometric distance measurement device may also be used for imaging measurement of surfaces. In this context, the specific surface acts as a measuring reflector and may also be diffusive. Accordingly, in the case of such an application, the measuring reflector is positioned immovably. Through point-for-point sampling of the surface, i.e., of the measuring reflector, and determination of the absolute distance to each point of the surface, the respective surface topography may be recorded in this manner.

What is claimed is:

1. A device for interferometric distance measurement, comprising:
   a multiple wavelength light source adapted to emit a light beam having at least three different wavelengths and arranged as a fiber laser including at least three different Bragg gratings having grating constants matched to the wavelengths;
   an interferometer unit adapted to split up the light beam into a measuring light beam that propagates in a measuring arm in a direction of a measuring reflector and that is reflected back by the measuring reflector and into a reference light beam that propagates in a reference arm in a direction of a stationary reference reflector and that is reflected back by the reference reflector, the measuring and reference light beams reflected back by the measuring and reference reflectors being superimposed in an interfering manner to form an interference light beam;
   a detection unit adapted to split the interference light beam to generate a plurality of phase-shifted partial interference signals for each wavelength; and
   a signal processing device adapted to determine an absolute position of the measuring reflector from the partial interference signals of the different wavelengths;
   wherein the multiple wavelength light source includes:
      a pump light source;
      at least three Bragg gratings integrated into at least one laser-active fiber, each Bragg grating having a phase shift of magnitude π; and
      coupling optics adapted to couple pump radiation emitted by the pump light source into the laser-active fiber.

2. The device according to claim 1, wherein the Bragg gratings are positioned in the laser-active fiber to completely overlap along a fiber extension direction, the phase shifts of all of the Bragg gratings being arranged at the same location.

3. The device according to claim 1, wherein the Bragg gratings are displaced with respect to each other along the fiber extension direction by particular offset distances, the phase shifts of all of the Bragg gratings being displaced with respect to each other along a fiber extension direction, by the offset distances.

4. The device according to claim 3, wherein the multiple wavelength light source includes three Bragg gratings, and
   a) at offset distances between 0% and 50% of an effective grating length of a Bragg grating, the laser-active fiber includes first grating sections having Bragg gratings with one grating constant, second grating sections having two overlapping Bragg gratings with different grating constants, and third grating sections having three overlapping Bragg gratings of different grating constants;
   b) at offset distances between 50% and 100% of the effective grating length of a Bragg grating, the laser-active fiber includes first grating sections having Bragg gratings of one grating constant and second grating sections having two overlapping Bragg gratings of different grating constants; or
   c) at offset distances of 100% of the effective grating length of a Bragg grating, the laser-active fiber includes only grating sections having Bragg gratings of one grating constant.

5. The device according to claim 1, wherein the laser-active fiber includes an erbium-doped, single-mode glass fiber adapted to emit laser radiation having a specific polarization direction.

6. The device according to claim 1, wherein the laser-active fiber is mounted in tension in a fiber holding device, between two fixing points, and the Bragg gratings are arranged between the two fixing points of the fiber holding device.

7. The device according to claim 1, further comprising a control unit adapted to control the multiple wavelength light source via at least one control element, in order to generate laser radiation having specific wavelengths, wherein an electrical signal derived from an optical signal of only one of the different wavelengths acts as an input signal of the control unit.

8. The device according to claim 7, wherein the control elements include:
   a) a piezoelectric actuator unit adapted to exert a specific mechanical tension on the laser-active fiber; and/or
   b) a tempering unit adapted to set a specific temperature of the laser-active fiber; and/or c) a current source adapted to set a specific pump current of a pumping light source for the laser-active fiber.

9. The device according to claim 7, wherein the control elements include a piezoelectric actuator unit adapted to exert a specific mechanical tension on the laser-active fiber.

10. The device according to claim 7, wherein the control elements include a tempering unit adapted to set a specific temperature of the laser-active fiber.

11. The device according to claim 7, wherein the control elements include a current source adapted to set a specific pump current of a pumping light source for the laser-active fiber.

12. The device according to claim 1, wherein the multiple wavelength light source is adapted to emit radiation having a first wavelength and two further wavelengths, satisfying the following conditions:

$$\lambda_2 = \frac{CAF_1}{CAF_1 \pm 1} \cdot \lambda_1$$

$$\lambda_3 = \frac{\lambda_1 \cdot \lambda_2}{\lambda_1 \pm \lambda_2 \cdot \frac{CAF_2 \pm 1}{CAF_1 \cdot CAF_2}}$$

$$CAF_1 = \frac{\Lambda_1}{\lambda_1}$$

$$CAF_2 = \frac{\Lambda_3}{\Lambda_1}$$

$$\Lambda_1 = \left|\frac{\lambda_1 \cdot \lambda_2}{\lambda_1 - \lambda_2}\right| \cdot CAF_1 \cdot \lambda_1$$

$$\Lambda_2 = \left|\frac{\lambda_2 \cdot \lambda_3}{\lambda_2 - \lambda_3}\right|$$

$$\Lambda_3 = \left|\frac{\Lambda_2}{\Lambda_1 - \Lambda_2}\right| \cdot \Lambda_1 = CAF_2 \cdot \Lambda_1,$$

$\lambda_1$ representing the first wavelength, $\lambda_2$ and $\lambda_3$ representing the two further wavelengths.

13. The device according to claim 1, wherein the interferometer unit includes a beam splitter unit, the measuring reflector, movable along at least one measuring direction, the stationary reference reflector, and a beam combiner unit, the beam splitter unit adapted to split the light beam into the measuring light beam and the reference light beam, the beam combiner unit adapted to superimpose the measuring light beam and the reference light beam, reflected back by the measuring reflector and the reference reflector, to form the interference light beam.

14. The device according to claim 13, wherein the beam splitter unit and the beam combiner unit together form a beam splitter cube.

15. The device according to claim 1, wherein the detection unit includes at least one splitter element, at least one polarization element, and a downstream detector array that includes at least nine opto-electronic detector elements, the splitter and polarization element adapted to split the interference light beam into at least three groups of interference light beams as a function of wavelength, each group of interference light beams including at least three phase-shifted partial interference light beams.

16. The device according to claim 15, wherein the detection unit includes a first splitter element and a second splitter element, the first splitter element adapted to split the interference light beams into the phase-shifted interference light beams, the second splitter element adapted to split, in accordance with wave-dependent splitting, the phase-shifted interference light beams into a plurality of partial interference light beams.

17. The device according to claim 1, wherein the signal processing unit is adapted to:
determine one phase value per wavelength, from the phase-shifted, partial interference signals of the different wavelengths;
form a plurality of differential phases from the phase values, each differential phase being assigned to different synthetic wavelengths; and
determine a high-resolution, absolute position of the measuring reflector from a rough position signal obtained via an additional rough position measurement and from the differential phases.

18. A device for interferometric distance measurement, comprising:
a multiple wavelength light source adapted to emit a light beam having at least three different wavelengths and arranged as a fiber laser including at least three different Bragg gratings having grating constants matched to the wavelengths;
an interferometer unit adapted to split up the light beam into a measuring light beam that propagates in a measuring arm in a direction of a measuring reflector and that is reflected back by the measuring reflector and into a reference light beam that propagates in a reference arm in a direction of a stationary reference reflector and that is reflected back by the reference reflector, the measuring and reference light beams reflected back by the measuring and reference reflectors being superimposed in an interfering manner to form an interference light beam;
a detection unit adapted to split the interference light beam to generate a plurality of phase-shifted partial interference signals for each wavelength; and
a signal processing device adapted to determine an absolute position of the measuring reflector from the partial interference signals of the different wavelengths;
wherein the detection unit includes at least one splitter element, at least one polarization element, and a downstream detector array that includes at least nine opto-electronic detector elements, the splitter and polarization element adapted to split the interference light beam into at least three groups of interference light beams as a function of wavelength, each group of interference light beams including at least three phase-shifted partial interference light beams.

19. The device according to claim 18, wherein the detection unit includes a first splitter element and a second splitter element, the first splitter element adapted to split the interference light beams into the phase-shifted interference light beams, the second splitter element adapted to split, in accordance with wave-dependent splitting, the phase-shifted interference light beams into a plurality of partial interference light beams.

* * * * *